United States Patent
Ludwig et al.

(10) Patent No.: US 11,279,340 B2
(45) Date of Patent: Mar. 22, 2022

(54) METHOD FOR CONTROLLING AN AUTOMATIC HYBRID TRANSMISSION OF A MOTOR VEHICLE, IN PARTICULAR A DHT TRANSMISSION, OR RESPECTIVELY A HYBRID TRANSMISSION FOR A MOTOR VEHICLE, IN PARTICULAR A DHT TRANSMISSION, WORKING ACCORDING TO THE AFOREMENTIONED METHOD

(71) Applicant: Volkswagen Aktiengesellschaft, Wolfsburg (DE)

(72) Inventors: Oliver Ludwig, Braunschweig (DE); Hendrik Schröder, Sickte (DE); Christian Meissner, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 310 days.

(21) Appl. No.: 16/566,181

(22) Filed: Sep. 10, 2019

(65) Prior Publication Data

US 2020/0079352 A1 Mar. 12, 2020

(30) Foreign Application Priority Data

Sep. 12, 2018 (DE) ...................... 10 2018 215 552.6

(51) Int. Cl.
*B60W 10/00* (2006.01)
*B60W 20/40* (2016.01)
(Continued)

(52) U.S. Cl.
CPC ............ *B60W 20/40* (2013.01); *B60W 10/06* (2013.01); *B60W 10/08* (2013.01); *B60W 10/101* (2013.01); *B60W 30/19* (2013.01)

(58) Field of Classification Search
None
See application file for complete search history.

(56) References Cited

U.S. PATENT DOCUMENTS 8,423,230 B2 4/2013 Steinhauser et al. ........ 701/29.2
2002/0093202 A1* 7/2002 Downs .................. B60W 10/06
290/40 R
(Continued)

FOREIGN PATENT DOCUMENTS

DE 10304130 A1 8/2003 ............. F16D 48/06
DE 102009001149 A1 8/2010 ............. B60K 6/387
(Continued)

OTHER PUBLICATIONS

German Office Action, Application No. 102018215552.6, 7 pages, dated Mar. 2019.

*Primary Examiner* — James M McPherson
(74) *Attorney, Agent, or Firm* — Slayden Grubert Beard PLLC

(57) ABSTRACT

A method for controlling an automatic hybrid transmission of the motor vehicle is disclosed, wherein the hybrid transmission has at least two engageable gear stages with different transmission ratios, and wherein at least one variable driving range, i.e., at least one specific dynamic powertrain path is engageable such that the entire output torque of the output shaft is formed from the respective drive torque of the internal combustion machine and the electric machine. Losses of comfort to the driver and/or the danger of component damage and the associated costs are reduced by checking during a stopping process, and/or during a deceleration process of the motor vehicle and a downshifting that is requested in this context whether there is a specific operating situation, and the variable driving range is engaged in the event that a specific operating situation exists.

14 Claims, 4 Drawing Sheets

(51) Int. Cl.
 *B60W 10/101* (2012.01)
 *B60W 30/19* (2012.01)
 *B60W 10/08* (2006.01)
 *B60W 10/06* (2006.01)

(56) References Cited

U.S. PATENT DOCUMENTS

2010/0125021 A1* 5/2010 Matsubara ............ B60W 10/08
 477/5
2019/0077246 A1 3/2019 Preuss et al.

FOREIGN PATENT DOCUMENTS

| DE | 102009026702 A1 | 12/2010 | ............ B60W 10/02 |
| DE | 102012208155 A1 | 11/2013 | ............ F16H 61/02 |
| DE | 102012218121 A1 | 4/2014 | ............ B60K 6/387 |
| DE | 102014211480 A1 | 12/2015 | ............ F16H 59/18 |
| DE | 102015226251 A1 | 6/2017 | ............. B60K 6/36 |
| DE | 102016216222 A1 | 3/2018 | ............. B60K 6/38 |
| WO | 2017/211339 A1 | 12/2017 | ............. B60K 6/36 |

\* cited by examiner

METHOD FOR CONTROLLING AN AUTOMATIC HYBRID TRANSMISSION OF A MOTOR VEHICLE, IN PARTICULAR A DHT TRANSMISSION, OR RESPECTIVELY A HYBRID TRANSMISSION FOR A MOTOR VEHICLE, IN PARTICULAR A DHT TRANSMISSION, WORKING ACCORDING TO THE AFOREMENTIONED METHOD

CROSS-REFERENCE TO RELATED APPLICATIONS

This application claims priority to German Patent Application No. DE 10 2018 215 552.6, filed on Sep. 12, 2018 with the German Patent and Trademark Office. The contents of the aforesaid patent application are incorporated herein for all purposes.

TECHNICAL FIELD

First of all, the invention relates to a method for controlling an automatic hybrid transmission of a motor vehicle, in particular a DHT transmission.

Moreover, the invention relates to an automatic hybrid transmission for a motor vehicle, in particular a DHT transmission, functioning according to the aforementioned method.

BACKGROUND

A plurality of automatically shifting hybrid transmissions for motor vehicles are already known in the prior art. This also includes the aforementioned DHT transmission that is used in the field of plug-in hybrids as an interesting transmission version, wherein an electric machine then also assumes subfunctions of the hybrid transmission (so-called DHT transmission). The advantage of such transmission versions is a potential reduction of transmission components, in particular the reduction of installation space, of costs, and/or the achievement of weight reduction up to the potential use of purely interlocking shift elements. Expressed otherwise, the normal separating clutches in particular can be omitted in DHT transmissions.

In the previously known methods for controlling a hybrid transmission of a motor vehicle, in particular a DHT transmission, the hybrid transmission has at least one internal combustion machine, in particular an internal combustion engine, and at least one electric machine, in particular an electric motor. Moreover, the hybrid transmission has at least two input shafts, at least one output shaft and at least two engageable and/or realizable gear stages with different transmission ratios. In the event that the hybrid transmission is designed as a DHT transmission, the latter is in particular, or respectively designed as a planetary transmission which will however be further explained in the following.

The internal combustion engine and/or the electric machine can be coupled and/or connected for conjoint rotation via at least one shift element that acts in a functionally interlocking manner with at least one input shaft. Hybrid transmissions for motor vehicles are known in which different dynamic powertrain paths are realizable within the hybrid transmission. With the hybrid transmission at issue here, at least one variable driving range, i.e., a specific dynamic powertrain path, is realizable such that the overall drive torque of the driveshaft is formed from the respective drive torques of the internal combustion machine and the electric machine, wherein the internal combustion machine is connected for conjoint rotation to a first input shaft, and the electric machine is connected to rotate with a second input shaft, and the rotational speeds of the internal combustion machine and the electric machine are coupled to each other by at least one gear stage at a specific ratio, yet are freely selectable.

For example, a method is known from the prior art in DE 10 2014 211 480 A1 for controlling an automatic transmission of a motor vehicle, wherein on the basis of the motor vehicle data determined from a driver assistance system, it is determined whether one of the driver's wishes of "constant driving" or "braking" is probable. In doing so, whenever the driver's wish of "constant driving" is probable, upshifting the automatic transmission is permissible even if a speed of the accelerator release is greater than a threshold, whereas if the driver's wish of "braking" is probable, then upshifting the automatic transmission is prevented when a speed of the accelerator release is greater than a threshold.

Accordingly for example in DE 103 04 130 A1, a method is described for preventing an engine of a motor vehicle from stalling in which in particular an automatic clutch is disengaged in a drivetrain of the motor vehicle if the rotational speed of a part in the drivetrain, preferably the rotational speed of the engine itself, falls below a specific threshold value (stalling threshold), and/or a clutch torque is decreased if the engine rotational speed falls below a threshold value (disengaging threshold).

Accordingly, a method and a device are known from DE 10 2009 026 702 A1 for controlling a parallel hybrid drivetrain of a motor vehicle in which, if the engine threatens to stall while the vehicle is braking, forced shifting to neutral is prepared and initiated as a subsequent measure. After a standstill, the vehicle can be started electrically, and the internal combustion engine can be reconnected once a corresponding transmission input rotational speed is reached.

Moreover a hybrid transmission of a motor vehicle is known from DE 10 2012 218 121 A1 in which traction power upshifts and thrust power downshifts are executed in a purely electrical mode from a first partial transmission to a second partial transmission.

Finally, a hybrid transmission of a motor vehicle is known from WO 2017/211339 A1, wherein the internal combustion machine is connected for conjoint rotation in this case to a first input shaft, and the electric machine is connected for conjoint rotation to a second input shaft of the transmission. On the one hand, the respective input shafts can be coupled to each other for conjoint rotation via a shift element, on the other hand a driveshaft is provided that can be coupled to the respective input shafts via gear stages, wherein dynamic powertrain paths can also be realized in which the driveshaft can be driven both with the internal combustion machine as well as with the electric machine, or expressed otherwise, the output torque of the output shaft is composed, or respectively correspondingly formed from the drive torque of the internal combustion machine.

The automatic hybrid transmission of a motor vehicle on which the present disclosure is based has at least the aforementioned variable driving range, i.e., at least one specific drivetrain efficiency can be realized such that the entire output torque of the output shaft is then formed, or respectively composed of the respective drive torques of the internal combustion machine and the electric machine, wherein the internal combustion machine is connected to rotate with a first input shaft, and the electric machine is connected to rotate with a second input shaft, and the rotational speeds of the internal combustion machine with the electric machine are coupled to each other via at least one gear stage at a certain ratio, yet are freely selectable, in particular such that the internal combustion machine can also be operated in idling speed. In this case, the internal combustion machine and/or the electric machine, in particular however the electric machine is connected for conjoint rotation by an interlocking shift element to the respective gear input shaft.

Generally however, a problem with the aforementioned generic hybrid transmissions, in particular so-called DHT transmissions as well, is that certain constraints apply under which specific shifting processes are possible, in particular due to the use of shift elements that interlock, or that respectively functionally act/are effective in an interlocking manner, and/or the coupled dynamic powertrain paths of the internal combustion machine and electric machine, wherein these however also require at least a certain time/duration due to signal propagation times and adjustment times of the shift elements. In normal driving mode, this circumstance is not perceived by the driver. In particular however during strong motor vehicle decelerations, i.e., for example during motor vehicle stopping processes and/or braking processes where the speed of the motor vehicle is correspondingly reduced, various situations may be problematic: It can accordingly happen that an existing powertrain connection between the internal combustion machine and driveshaft is not disconnected in a timely manner, and therefore internal combustion engine stalls. At a minimum, the driver is however confronted with/annoyed by acoustic reductions in comfort. After a stopping process, the respective shifting may be concluded, in this case the respectively required downshifting to the originally desired target gear, and the internal combustion engine may be restarted, but if the vehicle does not come to a stop/standstill, the driver perceives significantly less traction. Moreover, and this is also a highly critical operating situation, a required downshift such as from the second to the first gear stage may have to be prevented for example during an ABS intervention since otherwise, from a lack of conditions of synchronization, the danger may threaten of destroying the shift elements that act in a functionally interlocking manner, or respectively component damage to these shift elements may in particular occur from the above-described situation, which can generate correspondingly large servicing, and/or installation, and/or repair costs.

SUMMARY

An object thus exists to configure and develop the aforementioned methods, or respectively the hybrid transmission functioning according to the aforementioned method to reduce and/or prevent potential losses in comfort to the driver, in particular however to also reduce the danger of potential component damage and the associated costs.

The above-outlined object is solved by a method and a hybrid transmission according to the independent claims. The dependent claims and the following specification describe embodiments of the invention.

The details of one or more embodiments are set forth in the accompanying drawings and the description below. Other features will be apparent from the description, drawings, and from the claims.

DETAILED DESCRIPTION

Figure 1:
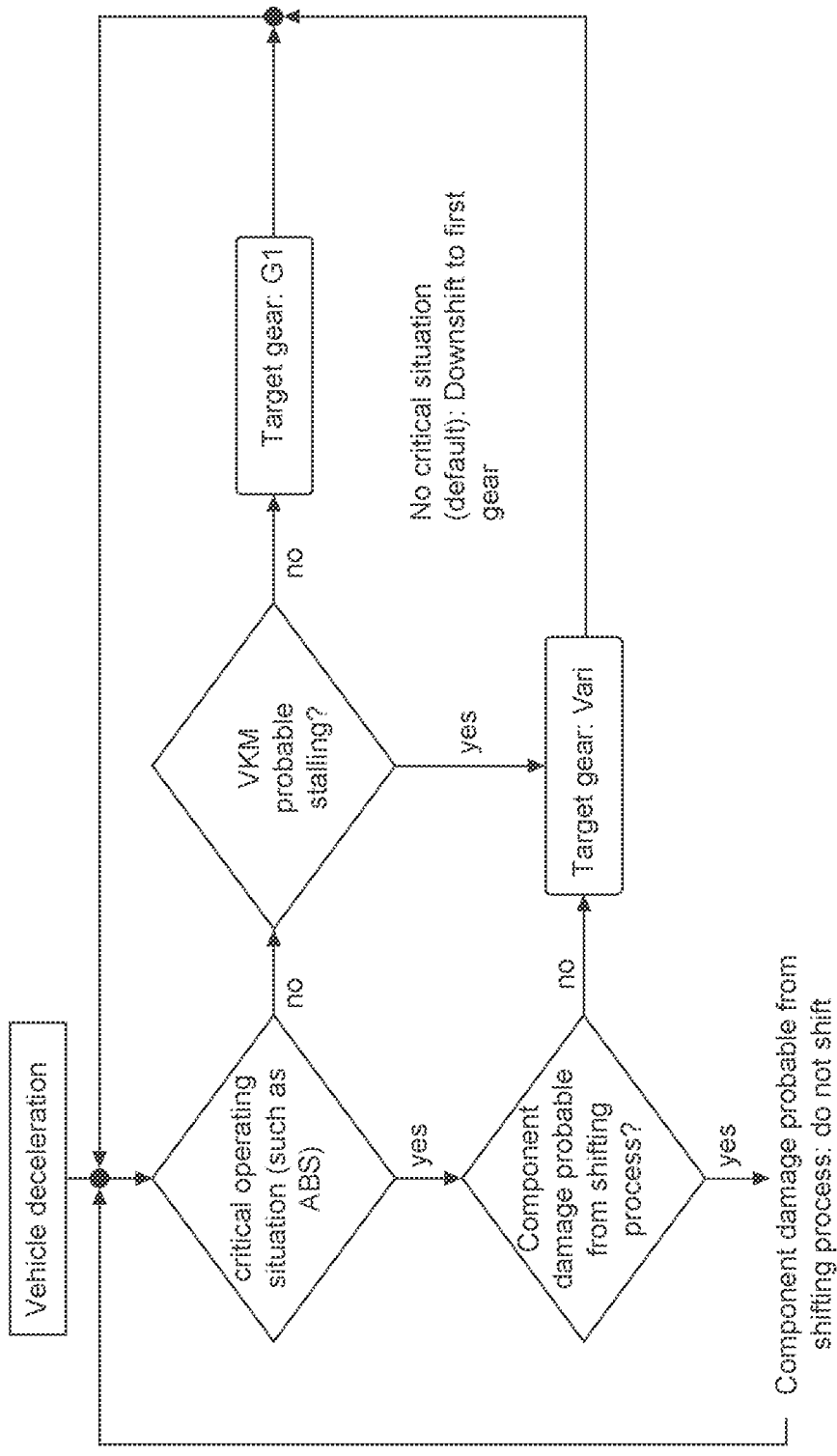
FIG. 1 shows a schematic block diagram to illustrate an embodiment of a method of controlling an automated hybrid transmission of a motor vehicle.

In the method according to a first exemplary aspect, it is always checked during a stopping process, and/or during a deceleration process of the motor vehicle and a downshifting that is requested in this context (downshift request) whether there is a critical operating situation, and the variable driving range is then realized in the event that a specific critical operating situation exists. In this "variable driving range" mode, the rotational speed of the internal combustion machine and the electric machine are coupled to each other in particular in an employed and/or engaged gear stage at a specific ratio, but are then correspondingly freely selectable and/or adjustable such that the internal combustion engine can also be operated when the vehicle is stopped and/or at a very low speed above the idling speed.

In some embodiments, the hybrid transmission can be controlled and/or operated more comfortably, wherein shift elements that act in a functionally interlocking manner can be employed so that the use of normal separating clutches and the associated cost, weight and installation space can be avoided.

In some embodiments, the following situations are considered specific critical operating situations: a braking intervention, or respectively braking, such as for example ABS, ESP and/or EDS braking of the motor vehicle, and/or a control error by the hybrid transmission, and/or an initial warning by a driver assistance system, and/or an initial warning by a "car-to-car" system. To ascertain a specific critical operating situation, the rotational speeds, such as for example the synchronous rotational speeds and/or the rotational speed gradients of the shafts of the hybrid transmission, such as for example the input shafts, the output shaft and/or an intermediate shaft are monitored and/or transmitted. Moreover, the brake pedal value, and/or the brake pedal gradient, and/or the vehicle longitudinal acceleration, and/or the road incline can be monitored and/or ascertained in order to ascertain a specific critical operating situation.

To ascertain and/or determine a specific critical operating situation, e.g., the aforementioned, corresponding limit values are defined and/or determined, such as for example corresponding limit values are defined and determined for the rotational speeds, such as for example the synchronous rotational speeds, and/or the rotational speed gradients of the shafts of hybrid transmission, and/or for the brake pedal value and/or for the brake pedal gradient, and/or for the vehicle longitudinal acceleration, and/or for the road incline. The corresponding threshold values are correspondingly saved in the engine and/or transmission control unit. By correspondingly ascertaining and/or in particular permanently monitoring the aforementioned rotational speeds/rotational speed gradients of the respective shafts and/or the pedal values, such as for example the brake pedal values and/or the brake pedal gradients, and/or the vehicle longitudinal acceleration, and/or the road incline, the respective critical operating situations can be determined and/or ascertained depending on the specific definition taking into account the threshold values respectively saved therefor when they then exist in the driving mode of the hybrid transmission, or respectively when they exceed or undershoot these respective threshold values.

In some embodiments of the method according to the present aspect, it is checked before shifting to the variable driving range, but initially beforehand in a step, if component damage in the hybrid transmission, such as for example damage to the shift element, may occur when shifting to the variable driving range, and/or may occur with at least a certain minimum probability. If the aforementioned check of component damage affirms potential component damage as the result of shifting, shifting to the variable driving range will not be carried out in some embodiments. If however the check of component damage does not affirm potential component damage as the result of shifting, shifting to the variable driving range is carried out in some embodiments. In the embodiments described here, an additional test may be performed such as for example before shifting to the variable driving range, such as for example in order to avoid component damage in the hybrid transmission, such as for example component damage to the shifting elements acting in a functionally interlocking manner.

In some embodiments, if it is first determined that a critical operating situation does not exist, it is then checked in a subsequent step if the internal combustion machine will stall or would stall in a shift to the target gear originally defined in the downshift request and/or may occur with at least a certain minimum probability, and if a stalling of the internal combustion machine is rejected as a result after this check, shifting then occurs to this original target gear, but if a stalling of the internal combustion machine is affirmed as a result after this check, shifting occurs to the variable driving range. This significantly enhances the driving comfort for the driver and an unnecessary stalling of the internal combustion engine may be avoided.

According to a second aspect, a corresponding automatic hybrid transmission for a motor vehicle, such as for example a DHT transmission, is operated according to the above-described method according to the first aspect, or respectively functions accordingly. In this case, the hybrid transmission, or respectively the DHT transmission may for example be designed as a planetary transmission with at least one planetary stage, and in some embodiments with a plurality of planetary stages, to realize the different gear stages.

An embodiment of a correspondingly designed hybrid transmission that is designed as a planetary transmission with a plurality of planetary stages will also be described in even greater detail below.

There are a plurality of options for additional embodiments that develop the method according to the first aspect further.

In the following, further embodiments of the invention will be explained in greater detail with reference to the drawings and the associated description.

Figure 2A:
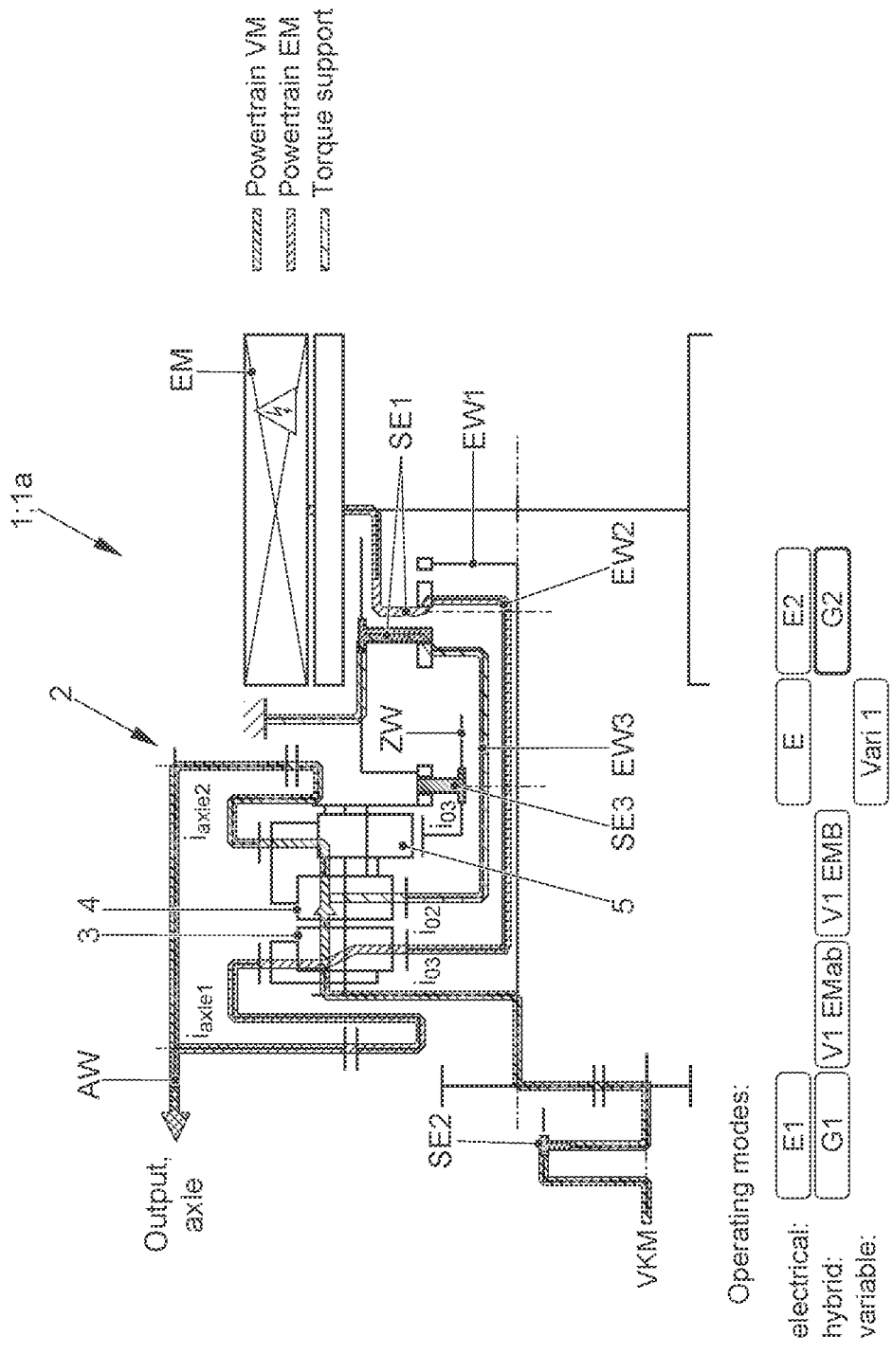
FIGS. 2a to 2c show schematic representations of an automatic hybrid transmission of a motor vehicle with corresponding components.
Figure 2B:
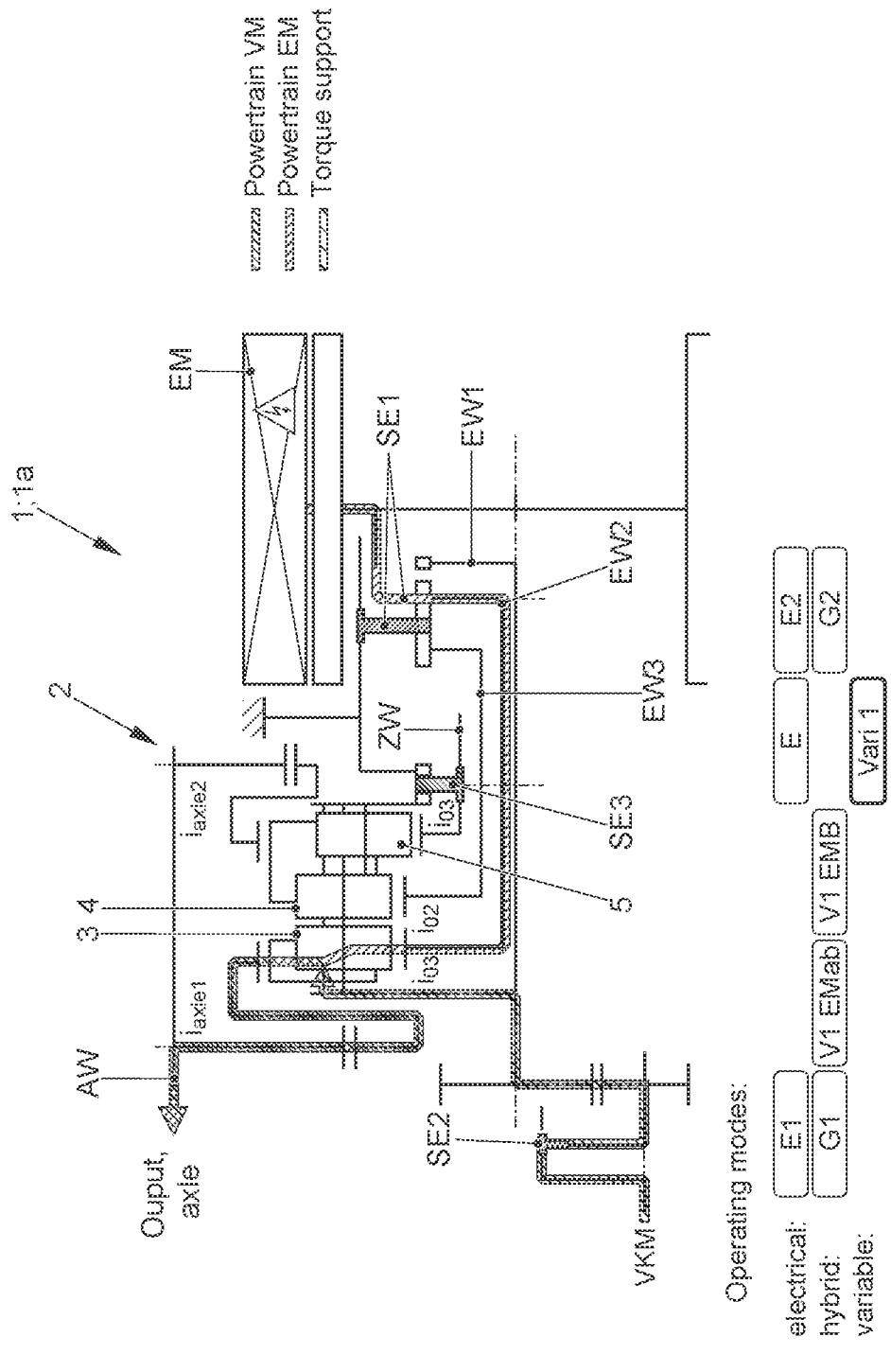
Figure 2C:
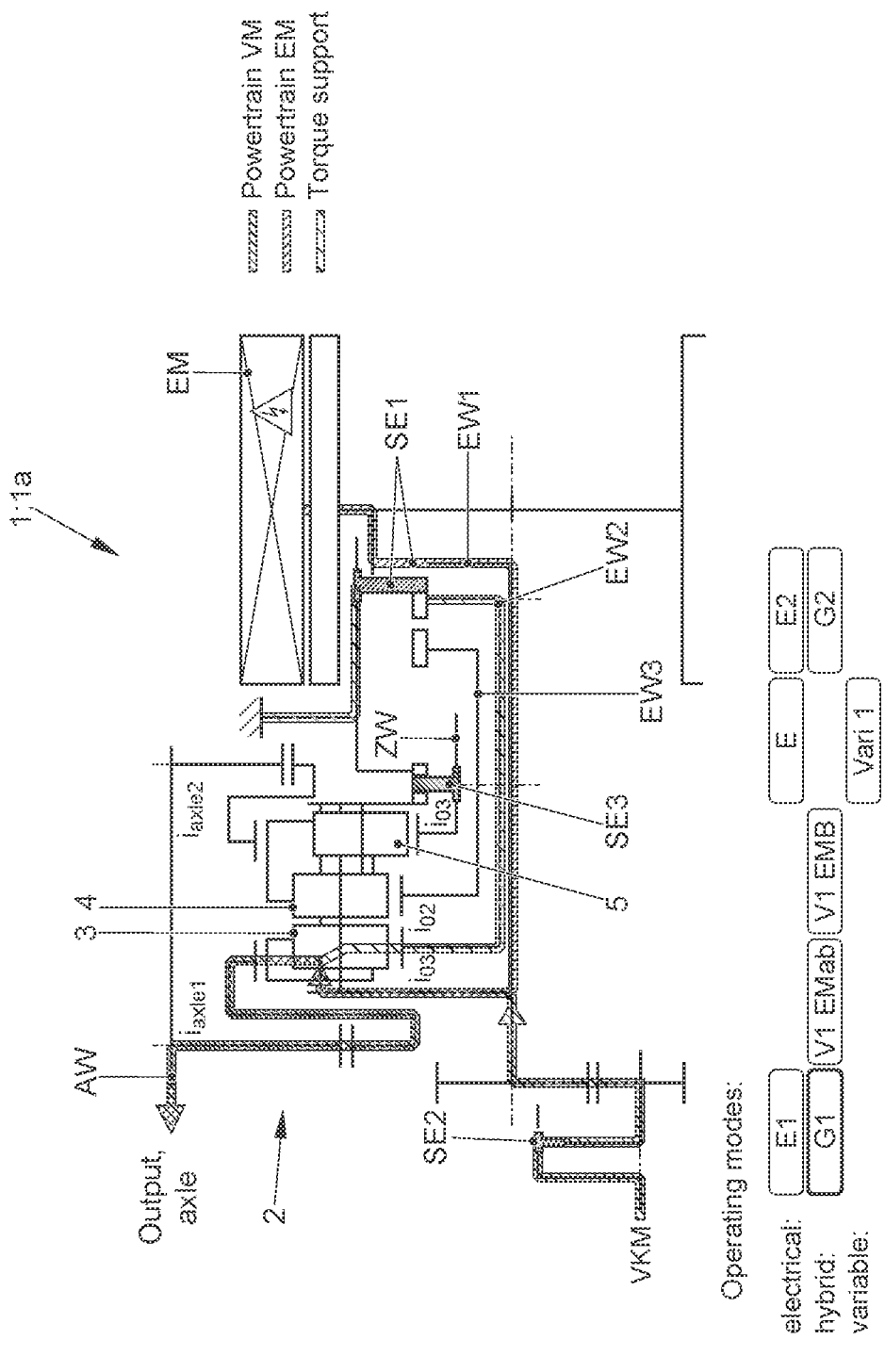

FIG. 1 shows a schematic block diagram to illustrate the method of controlling an automated hybrid transmission of a motor vehicle. FIGS. 2a to 2c show a schematic representation of an automatic hybrid transmission of a motor vehicle with the corresponding components, also with the depiction of the shift positions of a shift element that acts in a functionally interlocking manner and the respective dynamic powertrain paths for a requested downshift from a second gear stage to a first gear stage, wherein FIG. 2a shows the shifting state and the dynamic powertrain path when the second gear stage is engaged, FIG. 2b here shows the respective shifting state and the variable driving range, or respectively the associated corresponding dynamic powertrain path (where the rotational speeds of the internal combustion machine and the electric machine are coupled at a specific ratio but are freely selectable), wherein finally FIG. 2c shows the shifting state and the respective dynamic powertrain path that is realized when the first gear stage is engaged.

Before the method for controlling an automatic hybrid transmission of a motor vehicle, which is not portrayed here in greater detail, such as for example a DHT transmission 1a, is addressed below, the design of the present embodiment of a hybrid transmission 1, in particular a DHT transmission 1a will be described in greater detail below with reference to FIGS. 2a to 2c:

The hybrid transmission 1 portrayed in FIGS. 2a to 2c may be for example designed as a DHT transmission 1a. The hybrid transmission portrayed here in the present embodiment is correspondingly operated according to the method that will be described in greater detail below, or respectively functions accordingly.

The hybrid transmission 1 portrayed here is designed as a planetary transmission 2 and has a plurality of planetary stages 3, 4 and 5. Furthermore, the hybrid transmission 1 portrayed here has three transmission input shafts EW1, EW2 and EW3 that more or less act as respective sun wheels of the planetary transmission 2. Furthermore, at least one driveshaft AW is provided here that more or less acts as a ring gear of the planetary transmission 2.

Furthermore as is discernible in FIGS. 2a to 2c, there is an internal combustion engine VKM, which is only indicated here, and an electric machine EM. Here, also discernible are in particular three shift elements SE1, SE2 and SE3 that act in a functionally interlocking manner.

With the assistance of the first shift element SE1, the electric machine EM can be connected so as to rotate conjointly, or respectively rotate with, or to be coupled so as to rotate conjointly with one of the input shafts EW1, EW2 and/or EW3, wherein the first shift element SE1 is arranged in an axially movable manner. With the assistance of the second shift element SE2, the internal combustion engine VKM can be coupled, or respectively connected via a toothed gear pairing (not shown) to rotate conjointly, or to rotate with the first input shaft EW1. The second shift element SE2 is also designed to act in a functionally interlocking manner. Finally, FIGS. 2a to 2c show a third shift element SE3 that is also designed as a shift element that acts in a functionally interlocking manner, wherein an intermediate shaft ZW that more or less serves as a ring gear for the third planetary stage 5 and is mounted in the hybrid transmission 1 designed here as a planetary transmission 2 can be correspondingly secured for conjoint rotation, rotate freely or be coupled to a planet bar of the third planetary stage 5 by a corresponding axial shift.

FIGS. 2a to 2c in this case show a requested downshift of gear stages in the corresponding hybrid transmission 1, in particular in the event of a requested downshift from an engaged second gear stage, portrayed in FIG. 2a, to a first gear stage (as the original target gear of the requested downshift) portrayed in FIG. 2c, wherein the method according to the present embodiment is illustrated in FIG. 2b.

FIG. 2b shows in particular the realization of a variable driving range, i.e., a specific dynamic powertrain path is realized such that on the one hand all the output torque of the output shaft AW is formed from the respective drive torques of the internal combustion engine VKM and the electric machine VKM; on the other hand, however, the rotational speeds of the internal combustion machine VKM and the electric machine EM are coupled via at least one gear stage to each other at a specific ratio but are freely selectable. In this case, the internal combustion machine, as can be seen in the depiction in FIG. 2*b*, is coupled for conjoint rotation to the first input shaft EW1, and the electric machine EM is coupled to rotate with the second input shaft EW2. The latter is for example also discernible in the depiction of the respective powertrains.

The respective dynamic powertrain paths for the engaged second gear stage, for realizing the variable driving range, and for the engaged first gear stage are depicted in FIGS. 2*a*, 2*b* and 2*c* by corresponding partially dashed, partially dotted, and respectively dot-dashed lines, to which reference is again made.

The aforementioned disadvantages in the method according to the present embodiment are avoided by performing a check during a stopping process, and/or during a deceleration process (of the speed) of the motor vehicle, and a downshift requested in this context from a higher to a lower gear stage, in particular from the second to the first gear stage, as to whether a critical operating situation exists, and in the event that a specific critical operating situation exists, the variable driving range is realized as depicted in FIG. 2*b*. The method is therefore used when the motor vehicle realizes a stopping process, in particular up to a standstill, and/or a deceleration process is realized, in particular braking, or respectively slowing down occurs in order to correspondingly reduce the speed.

FIG. 1 shows a schematic block diagram that will be further explained below:

The method according to the present embodiment for controlling a hybrid transmission 1, such as for example a DHT transmission 1*a*, can be used in corresponding hybrid transmissions 1, such as for example in DHT transmissions 1*a*, such as for example in DHT transmissions 1*a* that are designed as a planetary transmission 2 as shown in FIGS. 2*a* to 2*c*.

The hybrid transmission 1 has at least one internal combustion machine VKM, such as for example an internal combustion engine, at least one electric machine EM, such as for example an electric motor, at least two input shafts, such as for example three input shafts EW1, EW2 and EW3, as well as at least one output shaft AW.

Moreover, the corresponding hybrid transmission 1 has at least two engageable, and/or realizable gear stages. For example, three planetary stages 3, 4 and 5 may exist in this case in order to realize different gear stages, wherein the at least two engageable and/or realizable gear stages can have different transmission ratios, such as for example the three planetary stages 3, 4 and 5 can also have different transmission ratios. In some embodiments, at least one first and second gear stage, e.g., a plurality of gear stages up to six, seven or eight gears/gear stages are realizable.

The internal combustion engine VKM and/or the electric machine EM can be coupled and/or connected for conjoint rotation via at least one shift element SE2, or respectively SE1 that acts in a functionally interlocking manner to at least one of the input shafts EW1, EW2 or EW3. Moreover, at least one variable driving range, i.e., a specific dynamic powertrain path is realizable such that the entire output torque of the output shaft AW is then formed from the respective drive torque of the internal combustion machine VKM and the electric machine EM, but the respective rotational speeds of the internal combustion machine VKM and the electric machine EM are freely selectable. Expressed otherwise, the rotational speeds of the internal combustion machine VKM and the electric machine EM are coupled to each other via at least one gear stage at a specific ratio, but are then at least freely selectable, or respectively adjustable such that the internal combustion machine VKM can be operated (at least always) above the idling speed. For example with regard to the variable driving range, i.e., for the then specific dynamic drivetrain path, the internal combustion machine VKM is coupled, or respectively connected so as to rotate conjointly with a first input shaft EW1, and the electric machine EM is coupled, or respectively connected so as to rotate conjointly with another, in this case, e.g., the second input shaft EW2 (see FIG. 2*b*).

The method according to the present embodiment is performed during a stopping process, and/or a deceleration process of the motor vehicle, such as during a braking process, and/or an actuation of the brake pedal.

It is also conceivable to use the method according to the present embodiments not just during a stopping process and/or during a braking process, but rather for example during a deceleration process in which the speed is correspondingly reduced in particular while lifting the accelerator, i.e., for example also a deceleration process of the motor vehicle in terms of its speed for example on a mountain.

During a corresponding stopping process and/or deceleration process of the motor vehicle, a downshift is correspondingly requested for an automatic hybrid transmission, for example from a second gear stage to a first gear stage. In this case, it is always checked during the requested downshift whether a critical operating situation exists, wherein in the event that a specific critical operating situation exists, the variable driving range (target gear: VARI) is then realized. This is correspondingly depicted in FIG. 1, wherein in the specific embodiment depicted here according to FIG. 1, further, in particular additional steps are realized which will be explained in greater detail below.

For example one of the following situations is considered a specific critical operating situation: a braking intervention, and/or a braking, in particular ABS, ESP and/or EDS braking of the motor vehicle, or a control error by the hybrid transmission, or an initial warning by a driver assistance system, or an initial warning by a "car-to-car" system, or a combination of the aforementioned situations as well.

Accordingly for example, ABS, ESP and/or EDS braking can for example be reported via the CAN bus of the vehicle to the engine and/or transmission control unit. In some embodiments however to ascertain a specific critical operating situation, the rotational speeds, in particular the synchronous rotational speeds and/or the rotational speed gradients of the shafts of the hybrid transmission 1, e.g., the input shaft EW1, EW2 and/or EW3, the output shaft AW and/or an intermediate shaft ZW are monitored and/or ascertained.

It is however also conceivable to monitor and/or ascertain the brake pedal value, and/or the braking gradient, and/or the vehicle longitudinal acceleration, and/or the road incline to ascertain a specific critical operating situation, for example to also ascertain ABS, ESP and/or EDS braking. It is moreover conceivable for a response from an emergency brake assist to be ascertained and/or triggered, and a car-to-car communication can also for example trigger and/or recognize a critical operating situation, for example by a critical situation on the road in front of the motor vehicle ascertained with the assistance of sensors.

Therefore, specific different critical operating situations can be ascertained, and/or defined, or respectively determined.

To ascertain and/or determine a specific critical operating situation, e.g., corresponding limit values are defined and/or determined; for example corresponding limit values for the rotational speeds, for example the synchronous rotational speeds, and/or the rotational speed gradients of the shafts of hybrid transmission 1, and/or for the brake pedal value and/or for the brake pedal gradient, and/or for the vehicle longitudinal acceleration, and/or for the road incline are correspondingly stored and/or saved in the engine and transmission control unit.

As however illustrated in FIG. 1, before shifting to the variable driving range (target gear: VARI), there is first a check in another step in the embodiment of the method as to whether component damage in the hybrid transmission 1, such as for example damage to shift element SE1, will occur while shifting to the variable driving range. If the check of component damage affirms potential component damage as the result of shifting to the variable driving range, shifting to the variable driving range will not be carried out. If however the check of component damage does not affirm potential component damage as the result of shifting, shifting to the variable driving range is carried out as depicted in FIG. 1.

For the stopping process and/or deceleration process, the variable target range (target gear: VARI), i.e., the specific dynamic powertrain path as shown in FIG. 2b is selected, or respectively realized as the target gear as described above. E.g., potential component damage can be ascertained and/or monitored by monitoring synchronous rotational speeds, and/or rotational speeds, and/or the corresponding gradient of the respective shafts. To accomplish this, model-based and measured value-based determinations of the respective actuator positions and/or actuator changes have been previously ascertained and stored/saved in the engine and/or transmission control unit.

As however further shown in FIG. 1, it is also established, or respectively checked in the present embodiment, i.e., whether a critical operating situation does not exist, then it is checked in a subsequent step as to whether stalling of the internal combustion machine VKM would occur when shifting to the target gear originally defined by the downshift request, such as for example to the lower, in this case in particular first gear stage, and if stalling of the internal combustion machine is denied as a result of this check, shifting then occurs to this original target gear, in particular to the first gear stage. If however stalling of the internal combustion machine VKM is affirmed as a result of this check, shifting then occurs to the variable driving range as can be seen in FIG. 1.

In particular monitoring may in some embodiments correspondingly permanent whether not stalling of the internal combustion machine VKM occurs. To accomplish this, in particular the rotational speed gradients, brake pedal values, vehicle longitudinal deceleration, road incline and/or gradients, as well as provisional time shifting are also considered, or respectively "factored in" based on potential model calculations of the rotational speed behavior. Furthermore the comparison with movement patterns, or the movement patterns of brake pedal behavior by the driver can also be considered. The above described method can also be performed for the requested downshift from for example the third to the second gear stage, or from the fourth to the third gear stage.

REFERENCE NUMBER LIST

1 Hybrid transmission
1a DHT transmission
2 Planetary transmission
3 First planetary stage
4 Second planetary stage
5 Third planetary stage
EW1, EW2, EW3 Respective first, second and third input shaft
AW Output shaft
VKM Internal combustion machine
EM Electric machine
SE1 First shift element
SE2 Second shift element
SE3 Third shift element
ZW Intermediate shaft The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the words "comprising" and "including" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for controlling an automated hybrid transmission of a motor vehicle, wherein the hybrid transmission has at least one internal combustion machine, at least one electric machine, at least two input shafts, at least one output shaft, and at least two engageable gear stages with different transmission ratios, wherein the internal combustion machine and the electric machine are configured to be coupled or connected for conjoint rotation using at least one shift element that acts in a functionally interlocking manner with at least one input shaft, and wherein at least one variable driving range is engageable in which an output torque of the at least one output shaft is formed from a drive torque of the internal combustion machine and a drive torque of the electric machine, wherein the internal combustion machine is connected for conjoint rotation to a first input shaft, and the electric machine is connected for conjoint rotation with a second input shaft, and wherein respective rotational speeds of the internal combustion machine and the electric machine are coupled to each other by at least one gear stage at a specific freely selectable ratio, the method comprising:
   determining upon a downshifting request during one or more of a stopping process, and a deceleration process, whether a specific operating situation is present; and
   in the event that the specific operating situation is present, engaging the variable driving range.

2. The method according to claim 1, wherein the specific operating situations comprises one or more of a braking intervention a control error by the hybrid transmission, an initial warning by a driver assistance system, and an initial warning by a car-to-car system.

3. The method according to claim 1, comprising monitoring a rotational speed or a rotational speed gradient of one or more of the input shafts, the output shaft, and an intermediate shaft to determine if the specific operating situation is present.

4. The method according to claim 1, wherein one or more of a brake pedal value, a brake pedal gradient, a vehicle longitudinal acceleration, and a road incline are monitored to determine if the specific operating situation is present.

5. The method according to claim 1, wherein to determine a specific operating situation, corresponding limit values are defined for one or more of a rotational speed, a synchronous rotational speed, a rotational speed gradient, a brake pedal value, a brake pedal gradient, a vehicle longitudinal acceleration, and a road incline.

6. The method according to claim 1, comprising determining, before shifting to the variable driving range, whether component damage in the hybrid transmission, will occur when shifting to the variable driving range or may occur with at least a certain minimum probability.

7. The method according to claim 6, comprising: if the determination of component damage affirms potential component damage as a result of shifting, not carrying out shifting to the variable driving range will not be carried out.

8. The method according to claim 1, comprising: if it is determined that a specific operating situation does not exist, determining if the internal combustion machine will stall in a shift to a target gear originally defined in the downshift request or may occur with at least a certain minimum probability, and if so, shifting to the variable driving range.

9. An automatic hybrid transmission for a motor vehicle, wherein the hybrid transmission is operated according to the method according to claim 1.

10. The hybrid transmission according to claim 9, wherein the hybrid transmission is designed as one or more of a dedicated hybrid transmission (DHT) and a planetary transmission; wherein the hybrid transmission has at least one planetary stage to provide the different gear stages.

11. An automatic hybrid transmission for a motor vehicle, comprising:
at least one internal combustion machine;
at least one electric machine;
at least two input shafts; at least one output shaft; and
at least two engageable gear stages with different transmission ratios; wherein
the internal combustion machine and the electric machine are configured to be coupled or connected for conjoint rotation using at least one shift element that acts in a functionally interlocking manner with at least one input shaft; wherein
at least one variable driving range is engageable, in which an output torque of the output shaft is formed from a drive torque of the internal combustion machine and a drive torque of the electric machine; wherein
the internal combustion machine is connected for conjoint rotation to a first input shaft, and the electric machine is connected for conjoint rotation with a second input shaft;
wherein respective rotational speeds of the internal combustion machine and the electric machine are coupled to each other by at least one gear stage at a specific freely selectable ratio; and wherein
the automatic hybrid transmission is configured for determining upon a downshifting request during one or more of a stopping process and a deceleration process, whether a specific operating situation is present, and in the event that the specific operating situation is present, engaging the variable driving range.

12. The hybrid transmission according to claim 11, wherein the hybrid transmission is designed as one or more of a dedicated hybrid transmission (DHT) and a planetary transmission; wherein the hybrid transmission has at least one planetary stage to provide the different gear stages.

13. A motor vehicle with the automatic hybrid transmission of claim 11.

14. A motor vehicle with the automatic hybrid transmission of claim 9.

* * * * *